(12) United States Patent
Sato et al.

(10) Patent No.: US 7,924,471 B2
(45) Date of Patent: Apr. 12, 2011

(54) IMAGE PROCESSING APPARATUS AND IMAGE PROCESSING METHOD

(75) Inventors: Mineko Sato, Yokohama (JP); Hideaki Kurihara, Setagaya-ku (JP); Toshikazu Sekizawa, Fujisawa (JP); Rieko Akiba, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 11/746,800

(22) Filed: May 10, 2007

(65) Prior Publication Data
US 2007/0264068 A1 Nov. 15, 2007

(30) Foreign Application Priority Data

May 12, 2006 (JP) ................................. 2006-133849
Dec. 14, 2006 (JP) ................................. 2006-337158

(51) Int. Cl.
*H04N 1/40* (2006.01)
*G06K 15/22* (2006.01)
*G06F 3/12* (2006.01)

(52) U.S. Cl. ......... 358/3.28; 358/1.4; 358/1.9; 358/1.15

(58) Field of Classification Search ............... 358/3.28, 358/1.4, 1.9, 2.1, 502, 520, 1.15; 382/100; 347/16, 19, 241, 244, 246, 251, 255, 256, 258

See application file for complete search history.

(56) References Cited

U.S. PATENT DOCUMENTS 6,940,618 B2 * 9/2005 Kinas ............................ 358/1.4
7,286,682 B1 10/2007 Sharma et al.

FOREIGN PATENT DOCUMENTS

| EP | 1014318 A2 | 6/2000 |
|----|------------|--------|
| JP | 10-244727 A | 9/1998 |
| JP | 10-285327 A | 10/1998 |
| JP | 2000-182086 A | 6/2000 |
| JP | 2002-109113 A | 4/2002 |
| JP | 2002-142105 A | 5/2002 |
| WO | 2005/002880 A1 | 1/2005 |

* cited by examiner

*Primary Examiner* — Charlotte M Baker
(74) *Attorney, Agent, or Firm* — Canon USA, Inc. IP Division

(57) ABSTRACT

An image processing apparatus includes a receiving unit configured to receive a second image which forms a specified interference pattern when printed on a sheet on which a first image is printed, and a printing unit configured to print the second image received by the receiving unit on the sheet on which the first image is printed.

3 Claims, 14 Drawing Sheets

IMAGE PROCESSING APPARATUS AND IMAGE PROCESSING METHOD

BACKGROUND OF THE INVENTION

Description of the Related Art

Form overlay technology for overlaying a document image and a form image is known (see, e.g., Japanese Patent Laid-Open No. 10-244727).

However, the form overlay technology disclosed in Japanese Patent Laid-Open No. 10-244727 focuses only on generating a composite image by overlaying a form image and a document image, and is not security-conscious technology.

Therefore, it is expected to develop an information processing system capable of transmitting, through different channels, a plurality of images from which a composite image is generated.

SUMMARY OF THE INVENTION

The present invention addresses the above-described issues by providing, for example, an image processing apparatus, image processing method, and storage medium as described below.

According to an aspect of the present invention, an image processing apparatus includes a receiving unit configured to receive a second image which forms a specified interference pattern when printed on a sheet on which a first image is printed, and a printing unit configured to print the second image received by the receiving unit on the sheet on which the first image is printed.

According to another aspect of the present invention, an image processing apparatus includes a receiving unit configured to receive an image composed of a second image and a third image, the second image forming a specified interference pattern by interfering with a first image when printed on a sheet on which the first image is printed, the third image forming a pattern different from the specified interference pattern by interfering with the first image when printed on the sheet on which the first image is printed; and a printing unit configured to print the image received by the receiving unit on the sheet on which the first image is printed.

According to yet another aspect of the present invention, an image processing method includes receiving a second image which forms a specified interference pattern when printed on a sheet on which a first image is printed, and printing the second image received on the sheet on which the first image is printed.

According to still another aspect of the present invention, an image processing method includes receiving an image composed of a second image and a third image, the second image forming a specified interference pattern by interfering with a first image when printed on a sheet on which the first image is printed, the third image forming a pattern different from the specified interference pattern by interfering with the first image when printed on the sheet on which the first image is printed; and printing the image received on the sheet on which the first image is printed.

According to another aspect of the present invention, a computer-readable storage medium stores a program for enabling a computer to perform an image processing method as described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of an information processing system relating to the present invention will now be described.

First Exemplary Embodiment

Figure 1:
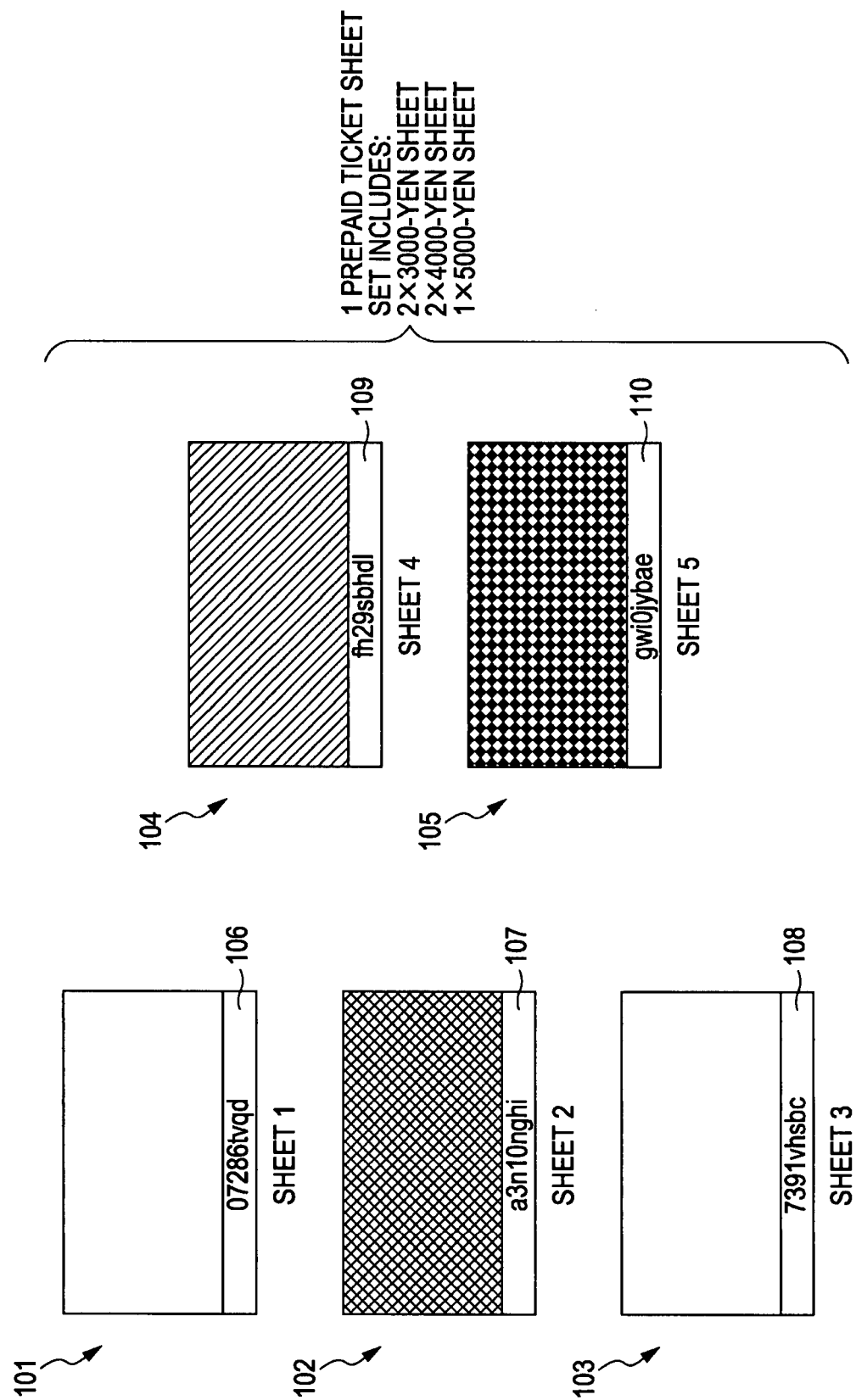
FIG. 1 illustrates sheets used on a client side for printing according to a first exemplary embodiment of the present invention.

FIG. 1 illustrates sheets used on a client side for printing according to a first exemplary embodiment of the present invention. As illustrated, a ticket prepaid sheet set includes prepaid sheets 101 to 105 (or SHEETS 1 to 5). Users purchase this prepaid sheet set at convenience stores, department stores, or the like. The prepaid sheets 101 and 102 can be used, for example, as 3000-yen tickets, the prepaid sheets 103 and 104 can be used, for example, as 4000-yen tickets, and the prepaid sheet 105 can be used, for example, as a 5000-yen ticket. The prepaid sheets 101 to 105 are sold as a set of five.

Different image patterns are printed on the prepaid sheets 101, 102, 103, 104, and 105, which include prepaid sheet IDs 106, 107, 108, 109, and 110, respectively, for identification of individual image patterns and amounts.

When prepaid sheets are sold, their sheet IDs are recorded and managed at a service center described below.

While a set of five prepaid sheets (including 3000-yen, 4000-yen, and 5000-yen sheets) is described in the present exemplary embodiment for illustrative purposes, the amounts (or values) and the number of sheets can be changed.

Figure 2:
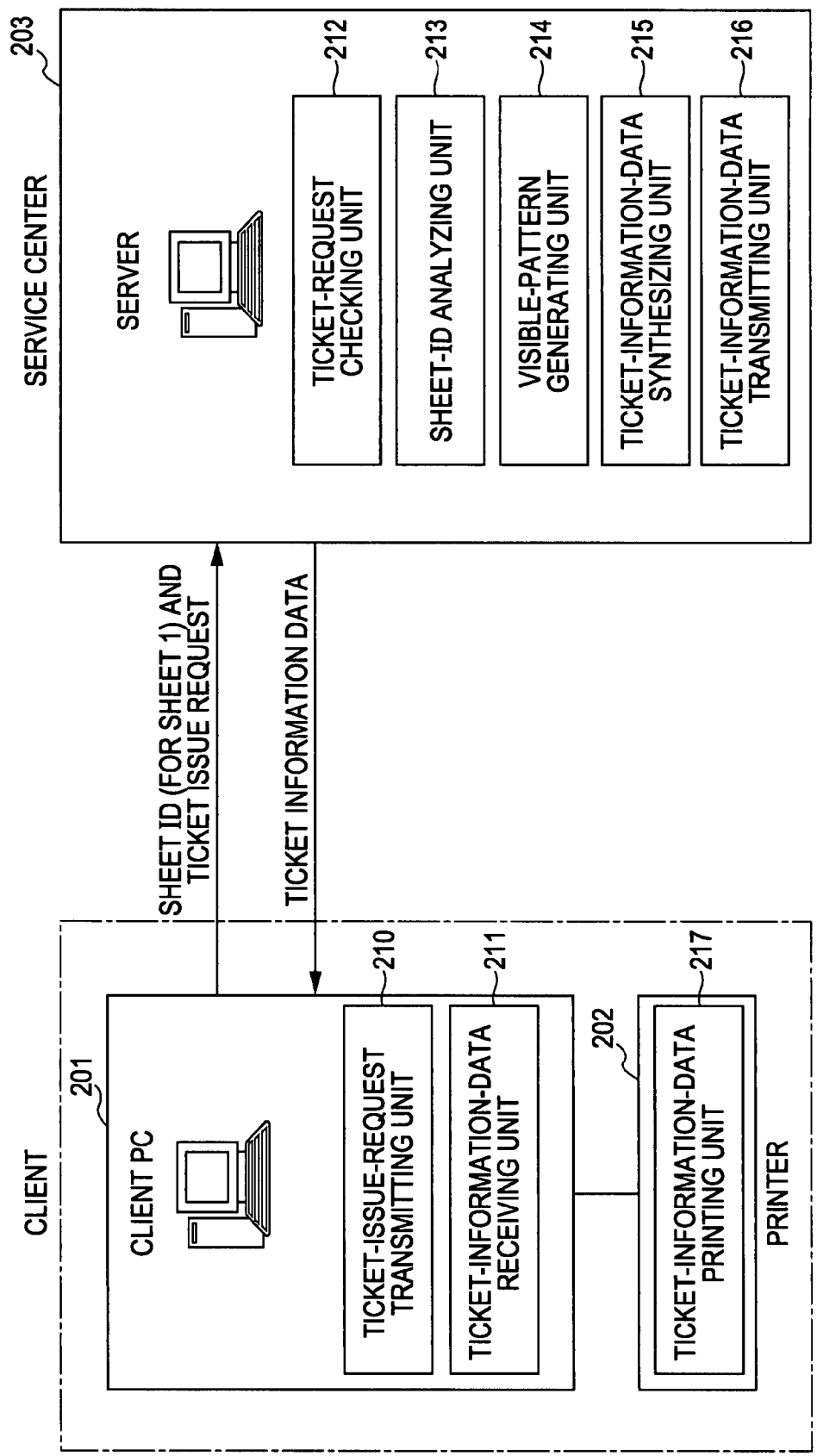
FIG. 2 is a diagram illustrating an exemplary configuration of an information processing system according to the first exemplary embodiment.

FIG. 2 is a diagram illustrating an exemplary configuration of an information processing system according to the first exemplary embodiment. An apparatus (image processing apparatus) on the client side includes a client PC 201 operated by the user and a printer 202 connected to the client PC 201. A server 203 for issuing tickets is installed in the service center and is connected to the client PC 201 through a network. The client PC 201 includes a central processing unit (CPU) (not shown) which controls the overall operation of the client PC 201. The server 203 also includes a CPU (now shown) which controls the overall operation of the server 203. The printer 202 also includes a CPU (now shown) which controls the overall operation of the printer 202.

When the user selects a desired concert ticket on a screen of the client PC 201, the price of this ticket appears on the screen. The following description will be made on the assumption that this price is 3000 yen. After checking that the price of this desired concert ticket is 3000 yen, the user uses a keyboard connected to the client PC 201 to enter the prepaid sheet ID 106 as identification information for identifying the 3000-yen prepaid sheet 101. In response to this, a ticket-issue-request transmitting unit 210 of the client PC 201 transmits information about the selected desired concert, sheet ID information, and ticket issue request to the server 203 of the service center.

Upon receipt of the ticket issue request from the client PC 201, a ticket-request checking unit 212 of the server 203 checks information about the user's desired ticket, availability, and the like. At the same time, a sheet-ID analyzing unit 213 of the server 203 determines whether the sheet ID received from the client PC 201 is a proper ID managed by the service center. If the received sheet ID is determined to be a proper ID, the sheet-ID analyzing unit 213 analyzes whether a price stored and associated with this sheet ID (e.g., if the sheet ID is 07286tvqd, which is assigned to SHEET 1, the price is 3000 yen) matches the price included in the ticket information checked by the ticket-request checking unit 212. Additionally, the sheet-ID analyzing unit 213 identifies an image pattern printed on the prepaid sheet 101 on the basis of the sheet ID.

The server 203 further includes a visible-pattern generating unit 214 for generating a visible pattern image, which forms a specified interference pattern when overlaid on the image pattern identified by the sheet-ID analyzing unit 213. The server 203 further includes a ticket-information-data synthesizing unit 215 which generates ticket information data by synthesizing the visible pattern generated by the visible-pattern generating unit 214 with ticket information, such as time and place of the concert. The server 203 further includes a ticket-information-data transmitting unit 216 which transmits the ticket information data generated by the ticket-information-data synthesizing unit 215 to the client PC 201.

The client PC 201 includes a ticket-information-data receiving unit 211 which receives the ticket information data transmitted from the server 203. The printer 202 connected to the client PC 201 includes a ticket-information-data printing unit 217 which forms an image corresponding to the received ticket information data on a sheet (e.g., prepaid sheet 101) set by the user on a paper feeder, such as a manual paper feed tray.

Figure 3:
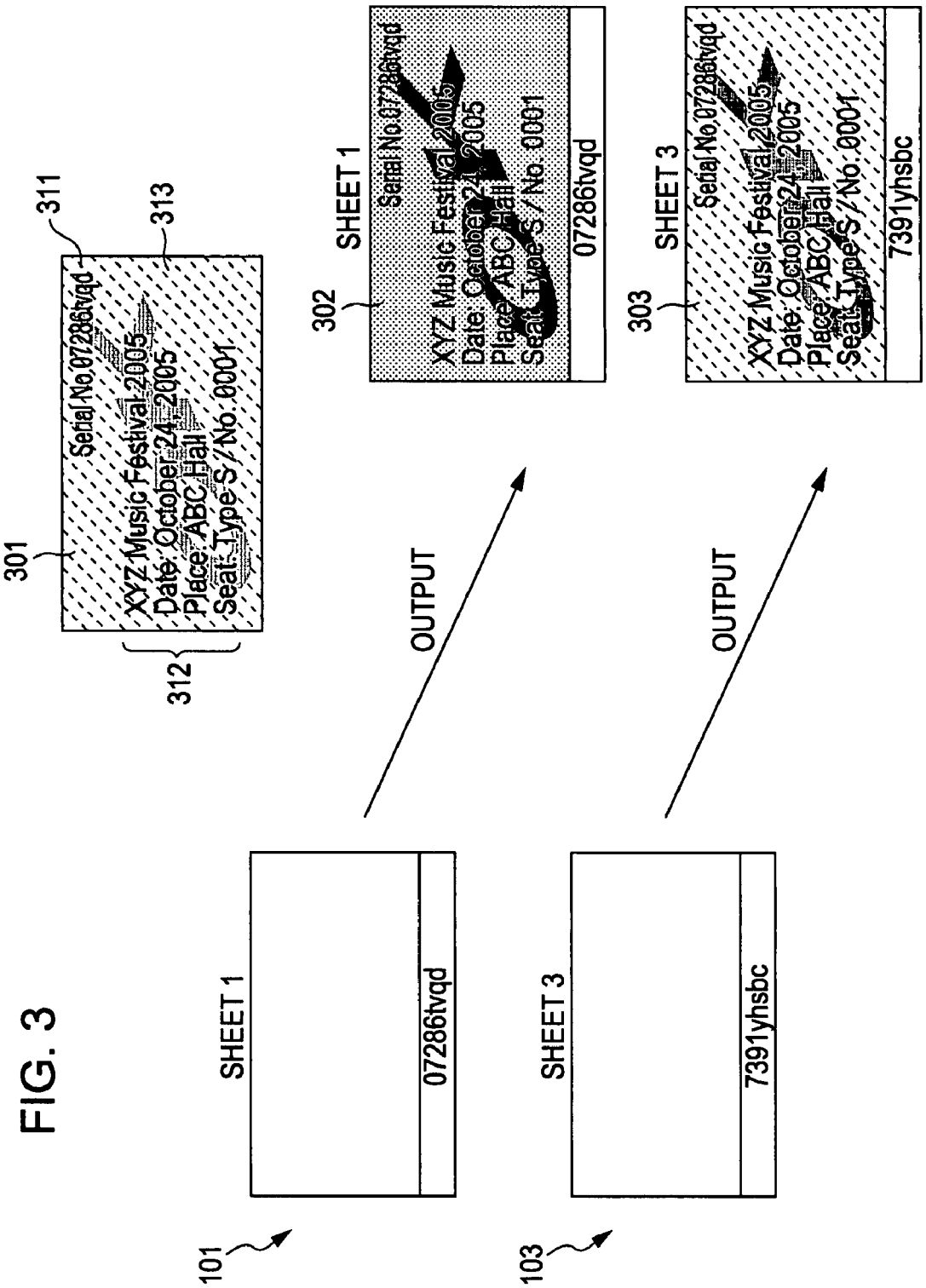
FIG. 3 illustrates exemplary ticket information data generated by a ticket-information-data synthesizing unit of the information processing system according to the first exemplary embodiment.

FIG. 3 illustrates exemplary ticket information data generated by the ticket-information-data synthesizing unit 215.

The prepaid sheets 101 and 103 include predetermined image patterns printed thereon.

Ticket information data 301 generated by the ticket-information-data synthesizing unit 215 includes a sheet ID number 311, ticket information 312, and visible pattern 313. When the visible pattern 313, which is generated by the visible-pattern generating unit 214, is printed over the image pattern printed on the prepaid sheet 101, a specified interference pattern (e.g., rosette pattern) appears in a specified area (e.g., "OK" area).

Printing results 302 and 303 are obtained by printing the ticket information data 301 on the prepaid sheet 101 (SHEET 1) and prepaid sheet 103 (SHEET 3) on the printer 202. A specified interference pattern appears in the printing result 302, since the ticket information data 301 is printed on the prepaid sheet 101 (SHEET 1) having the same ID as the sheet ID transmitted to the server 203. On the other hand, the specified interference pattern does not appear in the printing result 303, since the ticket information data 301 is printed on the prepaid sheet 103 (SHEET 3) having an ID different from the sheet ID transmitted to the server 203.

In the present exemplary embodiment, a ticket in which a specified interference pattern does not appear in a specified area is regarded as an invalid ticket. It should be understood that the user cannot see the concert with an invalid ticket.

In the present exemplary embodiment, an image pattern printed on a prepaid sheet is generated such that a specific pattern is visualized in a specified area when image data generated by the visible-pattern generating unit 214 is synthesized therewith.

Figure 6:
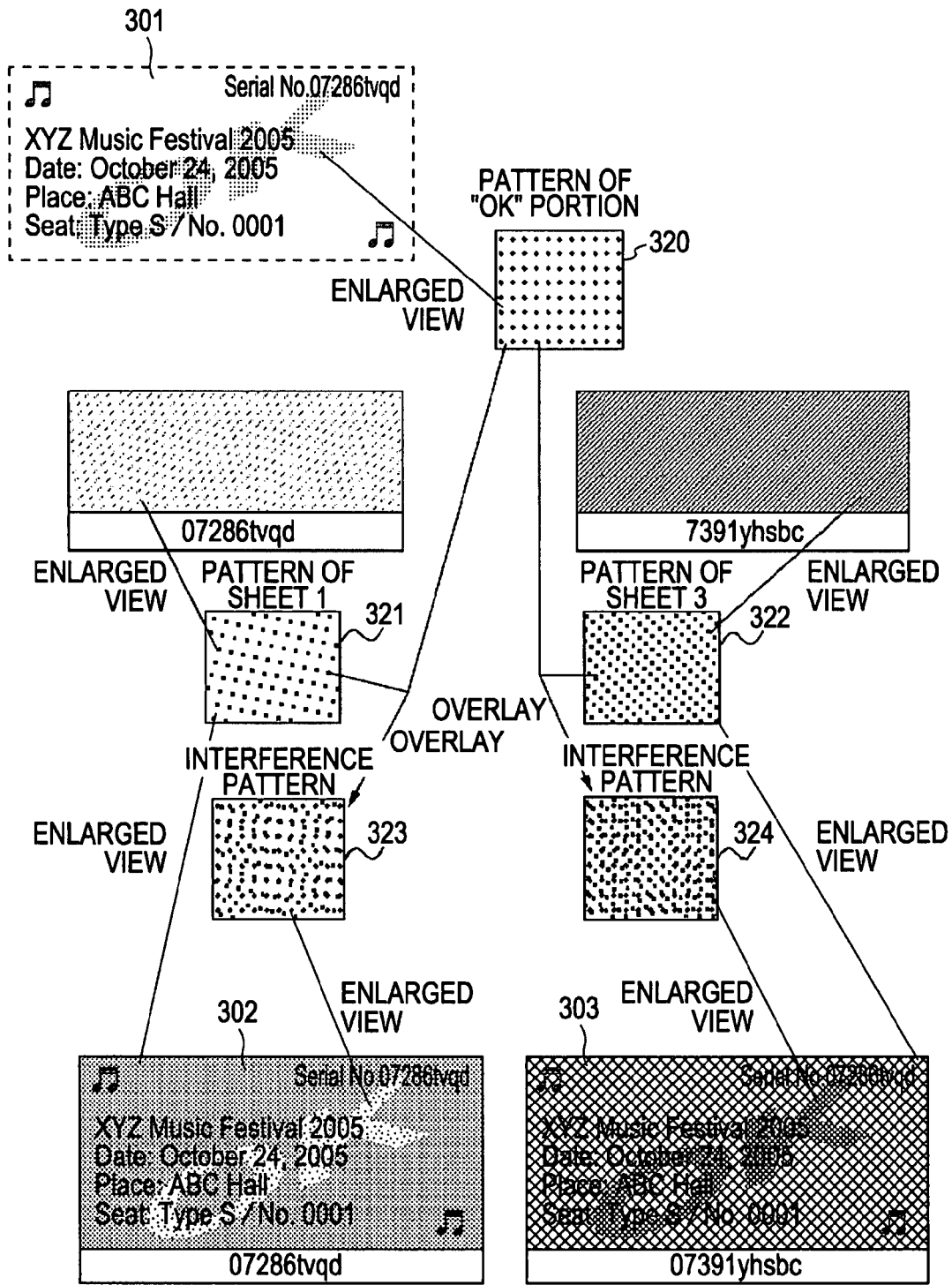
FIG. 6 illustrates exemplary processes of forming interference patterns.

FIG. 6 illustrates exemplary processes of forming interference patterns. In FIG. 6, there are illustrated an enlarged view of an "OK" pattern 320 (second image) which is a pattern of a character portion (i.e., "OK" portion) of the ticket information data 301, an enlarged view of a "SHEET 1" pattern 321 (first image) which is a background pattern of SHEET 1, and an enlarged view of a "SHEET 3" pattern 322 which is a background pattern of SHEET 3.

Dot size and pitch in the "SHEET 1" pattern 321 are the same as those in the "OK" pattern 320. The orientation of the dot array in the "SHEET 1" pattern 321 is rotated by 15 degrees from that in the "OK" pattern 320.

On the other hand, dot size and pitch in the "SHEET 3" pattern 322 are 70% of those in the "OK" pattern 320. The orientation of the dot array in the "SHEET 3" pattern 322 is rotated by 45 degrees from that in the "OK" pattern 320.

There are also illustrated an enlarged view of a specified interference pattern 323 formed by overlaying the "OK" pattern 320 on the "SHEET 1" pattern 321, and an enlarged view of another interference pattern 324 (not a specified interference pattern) formed by overlaying the "OK" pattern 320 on the "SHEET 3" pattern 322.

As will be seen from FIG. 6, the interference pattern 323 is a rosette pattern in which annular dot patterns are regularly and sequentially arranged. This rosette pattern is an example of the specified interference pattern of the present exemplary embodiment. On the other hand, the interference pattern 324 is not formed of annular dot patterns regularly and sequentially arranged. In other words, the interference pattern 324 is not the specified interference pattern.

As a result, while the "OK" portion, which is the specified area, in the printing result 302 is clearly distinguishable from the adjacent area, the "OK" portion in the printing result 303 is not clearly distinguishable from the adjacent area.

Next, operation flows of the information processing system of the present exemplary embodiment will be described with reference to flowcharts of FIGS. 4 and 5.

Figure 4:
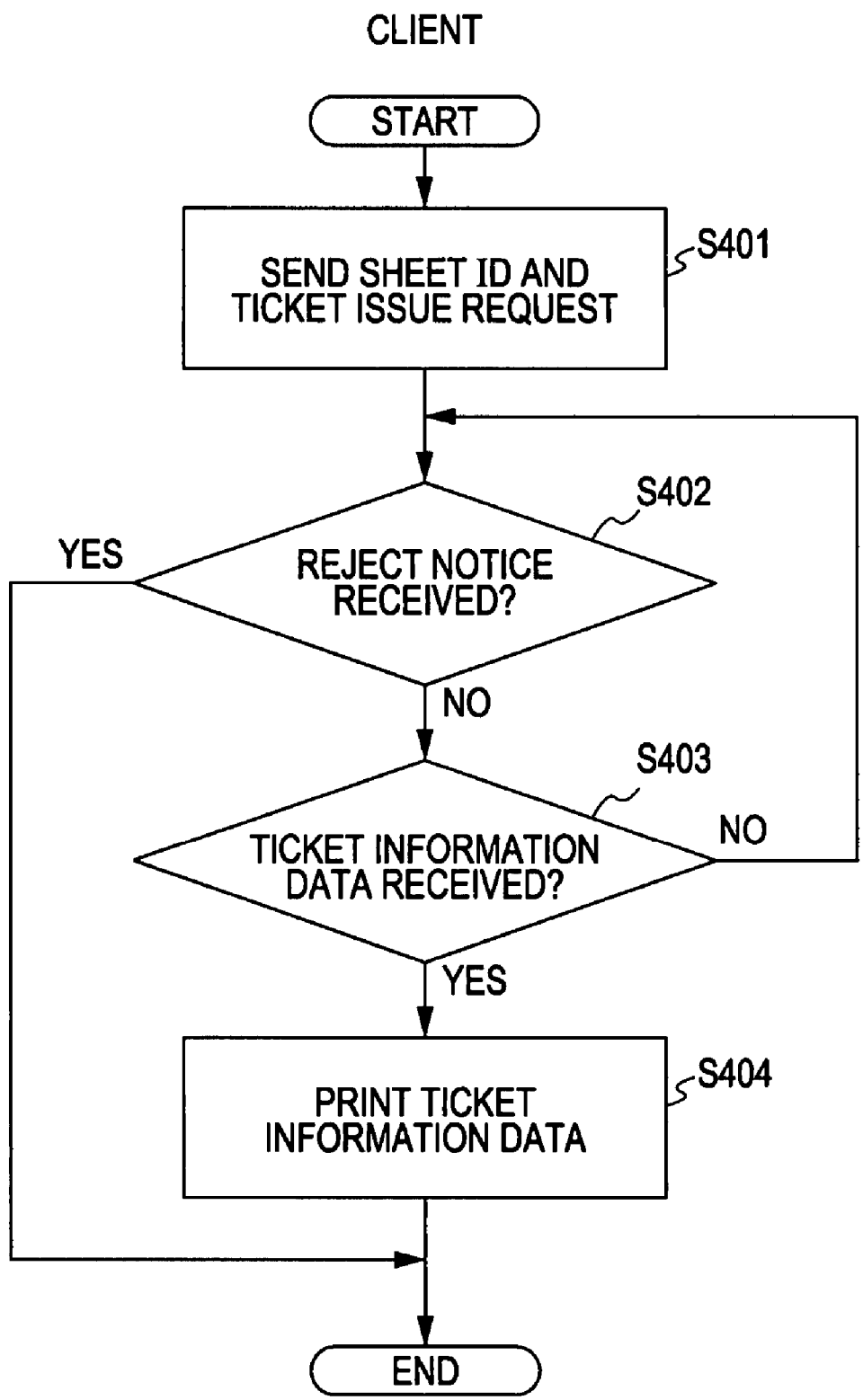
FIG. 4 is a flowchart illustrating a processing flow of a personal computer (PC) on a client side in the information processing system according to the first exemplary embodiment.
Figure 5:
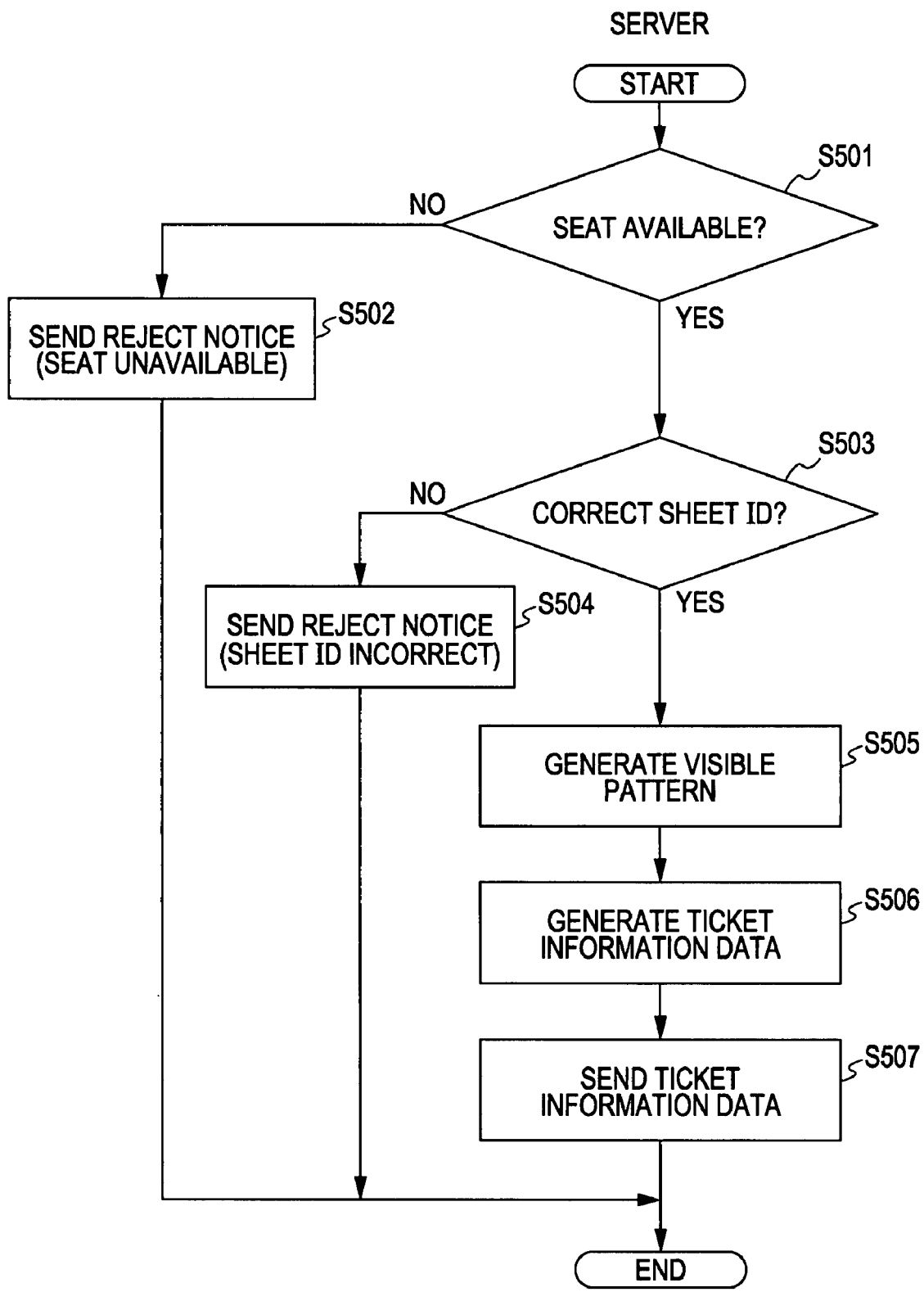
FIG. 5 is a flowchart illustrating a processing flow of a server of a service center in the information processing system according to the first exemplary embodiment.

FIG. 4 illustrates a processing flow of the client PC 201, and FIG. 5 illustrates a processing flow of the server 203. In either processing flow, the corresponding CPU controls the overall operation.

When the user selects a desired ticket on the screen of the client PC 201, the price of this ticket appears on the screen. After checking the price of the desired ticket, the user uses the keyboard connected to the client PC 201 to enter a sheet ID of a prepaid sheet that matches the price of the desired ticket. In response to this, the ticket-issue-request transmitting unit 210 of the client PC 201 transmits information about the selected desired ticket, sheet ID, and ticket issue request to the server 203 of the service center (step S401).

Upon receipt of the ticket issue request from the client PC 201, the ticket-request checking unit 212 of the server 203 checks information about the user's desired ticket, availability, and the like (step S501). If it is determined that no seats are available (NO in step S501), the server 203 informs the client PC 201 that the ticket cannot be issued (step S502). If it is determined that there are seats available (YES in step S501), the process proceeds to step S503.

In step S503, the sheet-ID analyzing unit 213 of the server 203 determines whether the sheet ID received from the client PC 201 is a proper ID. The sheet-ID analyzing unit 213 also determines whether a price stored and associated with the sheet ID matches the price included in the ticket information.

If the sheet ID is not a proper ID (NO in step S503), the process proceeds to step S504. If a price stored and associated with the sheet ID does not match the price indicated in the ticket information, the process also proceeds to step S504. Except for these two cases, the process proceeds to step S505. In step S504, the server 203 informs the client PC 201 that the ticket cannot be issued.

In step S505, the sheet-ID analyzing unit 213 of the server 203 identifies an image pattern printed on the prepaid sheet according to the sheet ID (i.e., identification information). On the basis of the identified image pattern, the visible-pattern generating unit 214 of the server 203 generates visible pattern image data, which forms a specified interference pattern when synthesized with the image pattern printed on the prepaid sheet.

The server 203 may have a first configuration in which, in step S505, the spatial frequency characteristics of the image pattern identified according to the sheet ID are analyzed, visible pattern image data is generated on the basis of the analyzed spatial frequency characteristics, and the generated visible pattern image data is expanded in a memory.

The server 203 may have a second configuration in which, if visible pattern image data is associated with the sheet ID in advance and stored, for example, in a hard disk drive (HDD) of the server 203, the stored visible pattern image data is expanded in a memory in step S505.

In either case (i.e., in the case of either the first or second configuration), visible pattern image data is expanded in a memory. Expanding visible pattern image data in a memory, as described above, will be expressed as "generating visible pattern image data".

In step S506, the ticket-information-data synthesizing unit 215 of the server 203 synthesizes content data (e.g., information, such as a concert name and time) and the visible pattern image data generated in step S505 to generate ticket information data.

In step S507, the ticket-information-data transmitting unit 216 of the server 203 transmits the ticket information data to the client PC 201.

Upon receiving a response from the server (reject notice sent in step S502 or step S504 or ticket information data sent in step S507), the client PC 201 determines whether a reject notice informing that a ticket cannot be issued has been received (step S402). If the reject notice has not been received (NO step S402), the client PC 201 determines whether ticket information data has been received (step S403). If it is determined that the reject notice has been received (YES step S402), the process ends. If it is determined that the ticket information data has not been received (NO step S403), the process returns to step S402.

If it is determined that the ticket information data has been received (YES step S403), the client PC 201 displays on its screen a message "Has a proper prepaid sheet been placed on the manual paper feed tray of the printer 202?". In response to this, if the user enters "OK" using the keyboard, the client PC 201 outputs the ticket information data to the printer 202.

Thus, by outputting the received ticket information data to the printer 202, the client PC 201 allows the ticket information data to be synthesized with the image data on the prepaid sheet.

The printer 202 forms an image corresponding to the ticket information data on the prepaid sheet (step S404).

In the present exemplary embodiment, if the price of the concert ticket requested by the user does not match the amount (or value) of the selected prepaid sheet, the user is informed that the ticket cannot be issued. It is also possible that if the price of the concert ticket does not match the amount of the prepaid sheet, for example, if the price of the concert ticket is 2800 yen and the amount of the prepaid sheet is 3000 yen, the 200-yen difference is refunded to the user at the concert site.

As described above, the present exemplary embodiment discloses a technique in which a prepaid sheet for example, for a concert or sporting event, is purchased at a convenience store or the like and placed on a paper feeder of a home printer and then, an image generated by a server is printed on the prepaid sheet. With this technique, the server-generated image can be overlaid on an image on the prepaid sheet, thus allowing a specified interference pattern to appear on the printing result.

Japanese Patent Laid-Open No. 2000-182086 proposes a system in which ticket information in which invisible user identification information is embedded is printed by a client PC. This system has a problem in that the ticket information may be used by malicious third parties if it is leaked out on a communication pathway.

Also, Japanese Patent Laid-Open No. 2002-109113 proposes a system in which ticket information in which tamper-evident data based on rules determined mutually with a ticket recipient is embedded is printed by a client PC. This system also has a problem in that the ticket information may be used by malicious third parties if it is leaked out on a communication pathway.

On the other hand, with the technique disclosed in the present exemplary embodiment, an image on a prepaid sheet reaches the user through face-to-face contact, while an image generated by the server reaches the user through a communication pathway. In other words, two images (i.e., an image on a prepaid sheet and an image generated by the server) that make up an original image are transmitted through different channels to the user. Therefore, even if one of the two images is stolen by a malicious third party, the original image itself is not lost. Thus, a higher security level than that of the ticket issuing systems disclosed in Japanese Patent Laid-Open No. 2000-182086 and Japanese Patent Laid-Open No. 2002-109113 can be achieved.

Exemplary embodiments below also disclose techniques in which two images are transmitted through different channels. Each of the exemplary embodiments achieves robust security by transmitting images through different channels.

First Exemplary Embodiment (First Modification of FIG. 6)

The example illustrated in FIG. 6 of the first exemplary embodiment described above is characterized in that the "OK" pattern 320 included in the ticket information data 301 is highly visible. In this case, the presence and shape of a resulting interference pattern is easily recognizable simply by looking at the ticket information data 301. This may affect the robustness of the security of the information processing system.

Figure 7:
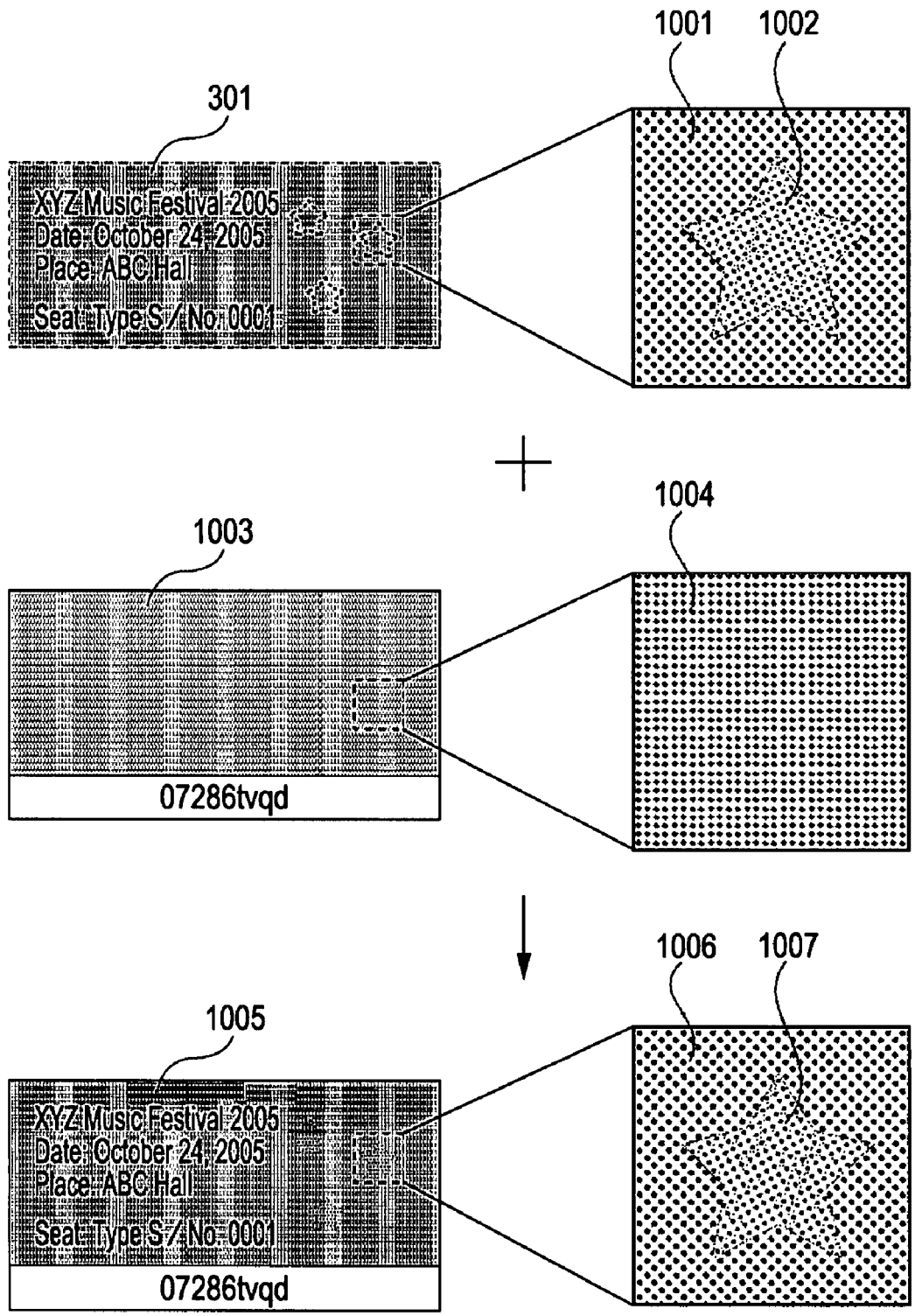
FIG. 7 illustrates an exemplary process of forming a less visible interference pattern.

FIG. 7 illustrates an exemplary process of forming a less visible interference pattern.

To make the presence and shape of graphic objects less noticeable, the pattern of the ticket information data 301 is composed of two types of patterns, that is, a background pattern 1001 (third image) and a graphic pattern 1002 (second image), while a single background pattern 1004 (first image) is formed on a sheet 1003. A printing result 1005 is obtained by printing the ticket information data 301 on the sheet 1003.

In the example of FIG. 7, the background pattern 1001 is a dot-growth screen pattern, which is typically referred to as a tint pattern, having a line density of 133 lines per inch (lpi) and a line angle of 45 degrees. The graphic pattern 1002 is a tint pattern having a line density of 133 lpi and a line angle of 15 degrees. In the background pattern 1001 and the graphic pattern 1002, a dot area ratio (or halftone dot area ratio) per unit area is 30%. Under these conditions, when observed with the naked eye at a distance ranging from 30 to 50 cm (called a normal viewing distance), the observed density of the background pattern 1001 is substantially the same as that of the graphic pattern 1002, because the halftone dot area ratio (or density in a given area) in the background pattern 1001 which is the same as that in the graphic pattern 1002. Therefore, the graphic pattern 1002 is less noticeable as it blends into the background pattern 1001.

The background pattern 1004 of the sheet 1003 has a line density of 133 lpi and a line angle of 0 degrees.

In the printing result 1005 obtained by printing the ticket information data 301 on the sheet 1003, an interference pattern 1007 formed by interference of the graphic pattern 1002 and the background pattern 1004 differs from an interference pattern 1006 formed by interference of the background pattern 1001 and the background pattern 1004. Therefore, the graphic objects with the interference pattern 1007 stand out against the background.

Thus, by forming the background pattern 1001 and graphic pattern 1002 of the ticket information data 301 such that they have the same line density of 133 lpi and different line angles (45 degrees and 15 degrees), the graphic objects with the graphic pattern 1002 are made less visible when viewed at a normal viewing distance. At the same time, by printing the ticket information data 301 on the sheet 1003 with the background pattern 1004 having a line density of 133 lpi and a line angle of 0 degrees, the graphic objects stand out against the background.

First Exemplary Embodiment (Second Modification of FIG. 6)

Figure 8:
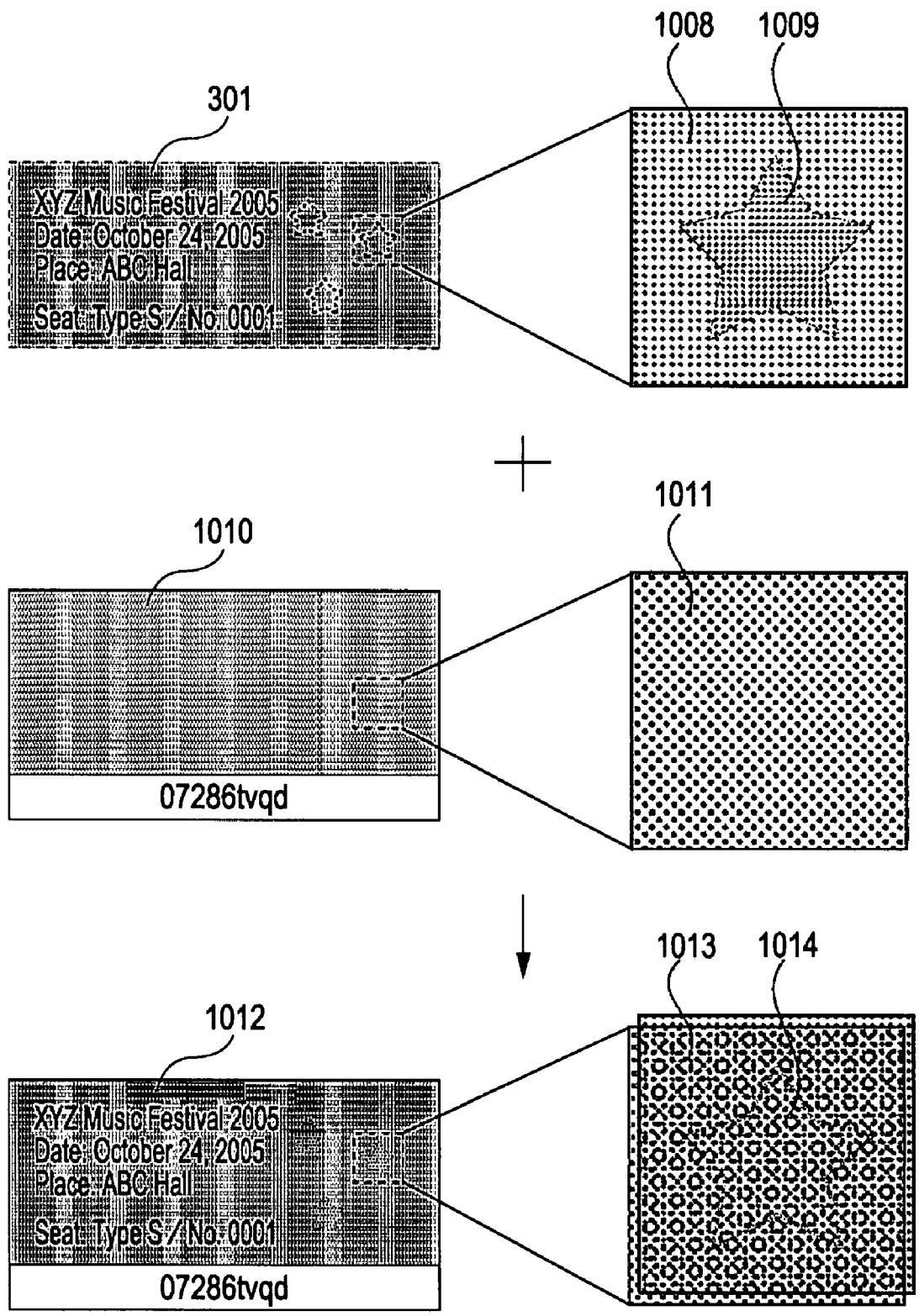
FIG. 8 illustrates an exemplary process of forming another less visible interference pattern.

FIG. 8 illustrates an exemplary process of forming another less visible interference pattern.

Referring to FIG. 8, the pattern of the ticket information data 301 is composed of two types of patterns, that is, a background pattern 1008 and a graphic pattern 1009, while a single background pattern 1011 is formed on a sheet 1010. A printing result 1012 is obtained by printing the ticket information data 301 on the sheet 1010.

In the example of FIG. 8, the background pattern 1008 is a tint pattern having a line density of 133 lpi and a line angle of 0 degrees, while the graphic pattern 1009 is a tint pattern having a line density of 150 lpi and a line angle of 0 degrees. In the background pattern 1008 and the graphic pattern 1009, a halftone dot area ratio per unit area is 30%. Under these conditions, while the size of a single halftone dot in the background pattern 1008 is different from that in the graphic pattern 1009, the area ratio of a halftone dot portion per unit area in the background pattern 1008 can be seen as substantially the same as that in the graphic pattern 1009. Since the observed density of the background pattern 1008 is thus substantially the same as that of the graphic pattern 1009, the graphic pattern 1009 is less noticeable as it blends into the background pattern 1008.

The background pattern 1011 of the sheet 1010 has a line density of 133 lpi and a line angle of 45 degrees.

In the printing result 1012 obtained by printing the ticket information data 301 on the sheet 1010, an interference pattern 1014 formed by interference of the graphic pattern 1009 and the background pattern 1011 differs from an interference pattern 1013 formed by interference of the background pattern 1008 and the background pattern 1011. Therefore, graphic objects with the interference pattern 1014 stand out against the background.

Thus, by forming the background pattern 1008 and graphic pattern 1009 of the ticket information data 301 such that they have the same line angle of 0 degrees and different line densities (133 lpi and 150 lpi), the graphic objects with the graphic pattern 1009 are made less visible when viewed at a normal viewing distance. At the same time, by printing the ticket information data 301 on the sheet 1010 with the background pattern 1011 having a line density of 133 lpi and a line angle of 45 degrees, the graphic objects stand out against the background.

Modification of First Exemplary Embodiment

Figure 9:
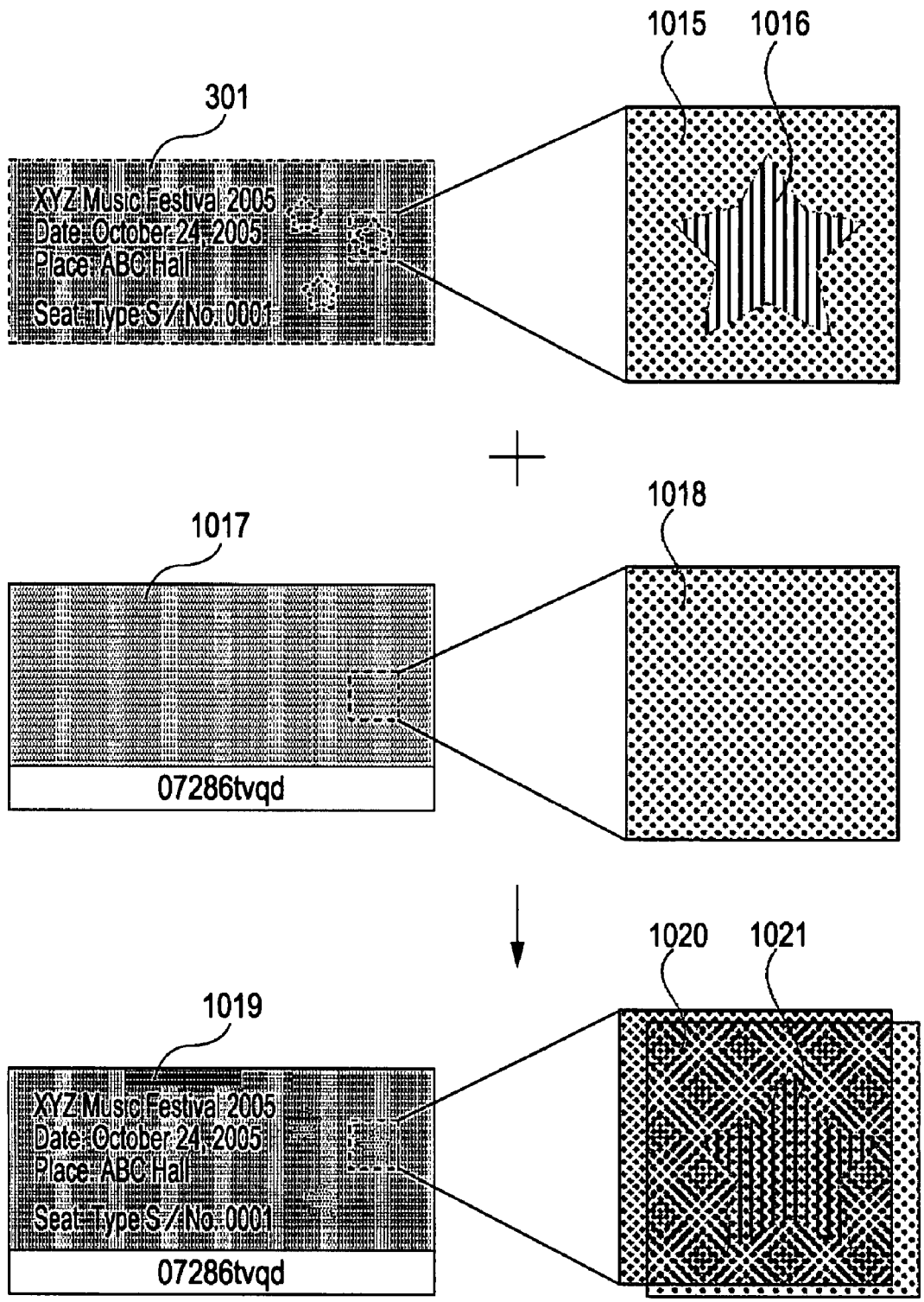
FIG. 9 illustrates an exemplary process of forming another less visible interference pattern.

FIG. 9 illustrates an exemplary process of forming another less visible interference pattern.

Referring to FIG. 9, the pattern of the ticket information data 301 is composed of two types of patterns, that is, a background pattern 1015 and a graphic pattern 1016 while a single background pattern 1018 is formed on a sheet 1017. A printing result 1019 is obtained by printing the ticket information data 301 on the sheet 1017.

In the example of FIG. 9, the background pattern 1015 is a tint pattern having a line density of 133 lpi and a line angle of 60 degrees, while the graphic pattern 1016 is a line-growth screen pattern having a line density of 133 lpi and a line angle of 0 degrees. A halftone dot area ratio per unit area in the background pattern 1015 is 30%, and a line area ratio per unit area in the graphic pattern 1016 is also 30%. Under these conditions, while the screen patterns of the background pattern 1015 and graphic pattern 1016 are different in design, the area ratio of a dot portion per unit area in the background pattern 1015 can be seen as substantially the same as the area ratio of a line portion per unit area in the in the graphic pattern 1016. Since the observed density of the background pattern 1015 is thus substantially the same as that of the graphic pattern 1016, the graphic pattern 1016 is less noticeable as it blends into the background pattern 1015.

The background pattern 1018 of the sheet 1017 has a line density of 133 lpi and a line angle of 15 degrees.

In the printing result 1019 obtained by printing the ticket information data 301 on the sheet 1017, an interference pattern 1021 formed by interference of the graphic pattern 1016 and the background pattern 1018 differs from an interference pattern 1020 formed by interference of the background pattern 1015 and the background pattern 1018. Therefore, graphic objects with the interference pattern 1021 stand out against the background.

Thus, by forming the background pattern 1015 and graphic pattern 1016 of the ticket information data 301 such that they have the same dot area ratio or line area ratio and have screen patterns of different growth modes, the graphic objects with the graphic pattern 1016 are made less visible when viewed at a normal viewing distance. At the same time, by printing the ticket information data 301 on the sheet 1017 with the background pattern 1018 having a line density of 133 lpi and a line angle of 15 degrees, the graphic objects stand out against the background.

Second Exemplary Embodiment

Figure 10:
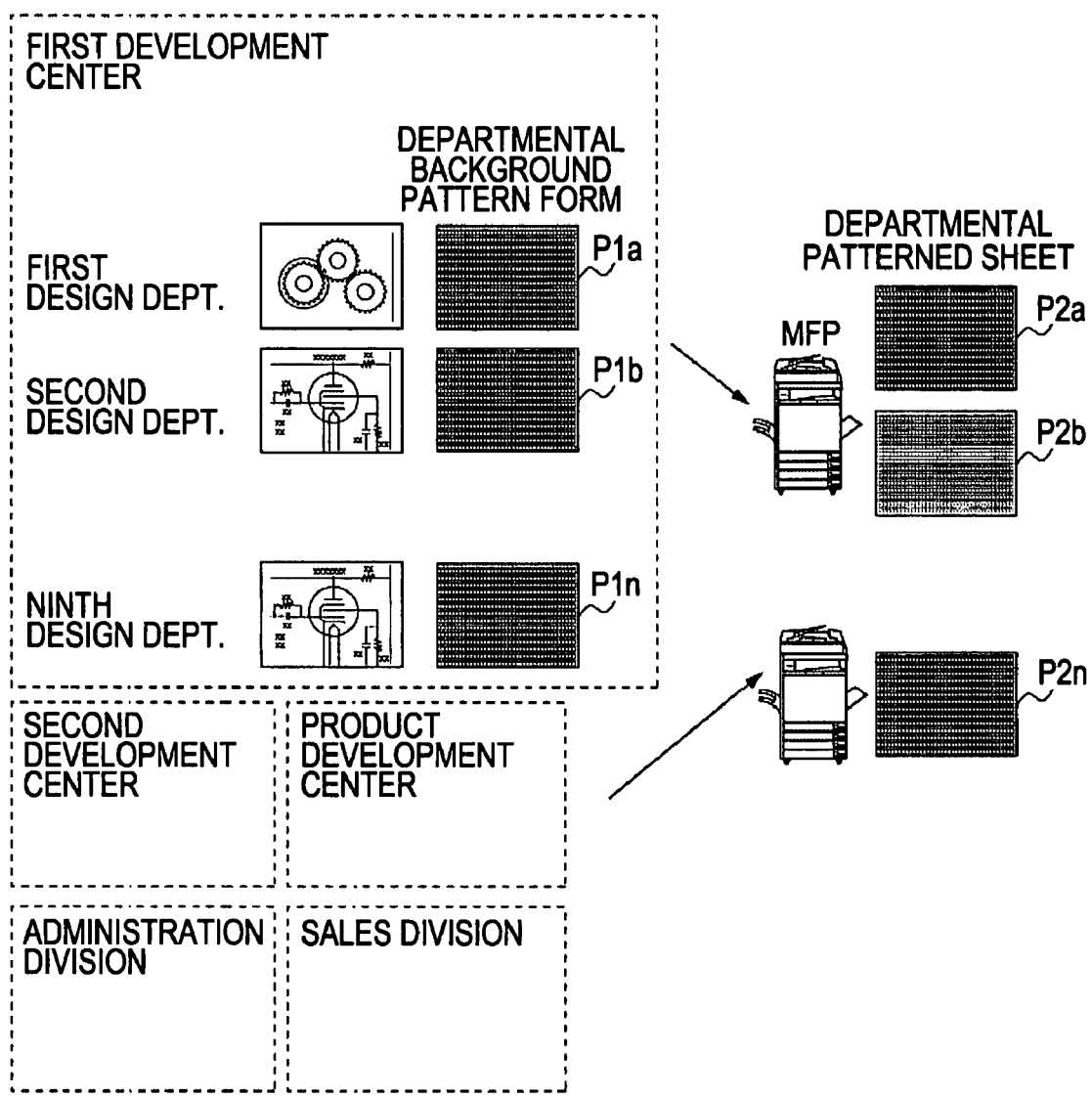
FIG. 10 illustrates a security printing system designed for use in a large company.

FIG. 10 illustrates a security printing system designed for use in a large company with many departments.

In large companies, there are typically various document printing needs of various departments. Since specialized tasks are assigned to respective departments, it is often necessary to place certain limits on interdepartmental information sharing even in the same company. To ensure security for such interdepartmental information sharing, a technique for transmitting two images (or patterns) through different channels, as described in the first exemplary embodiment, is used to realize a mechanism for verifying that a printed document from a department is a proper one.

Referring to FIG. 10, the first development center consists of nine departments, i.e., the first design department, the second design department, and so on, through the ninth design department. These design departments handle different specialized tasks, such as mechanical designing and electrical circuit designing, and are assigned background pattern forms (departmental background pattern forms) P1*a* through P1*n* that are unique to the respective departments. At the same time, sheets (departmental patterned sheets) P2*a* through P2*n* on which other patterns that are also unique to the respective departments are printed are prepared as print sheets for a multifunction printer (MFP).

For printing a drawing from each design department, a background pattern form that is unique to the design department is overlaid on the drawing, which is then transmitted to the multifunction printer. A method for overlaying the unique background pattern form on the drawing is determined according to the state of infrastructure at each site. Examples of such a method include a method in which a special printer driver for adding a fixed background pattern to a drawing is provided for each design department, and a method in which a background pattern is added to a drawing when the drawing is transmitted to a print server's spooler prepared for each design department.

A print job for the drawing on which a departmental background pattern is overlaid is transmitted to the multifunction printer and printed on a departmental patterned sheet. The background pattern forms P1*a* through P1*n* and the sheets P2*a* through P2*n* need to be designed such that a specified interference pattern appears when the combination of a drawing on which a departmental background pattern form is overlaid and a departmental patterned sheet is correct.

The methods of the first exemplary embodiment are applicable to pattern design for the background pattern forms P1*a* through P1*n* and the sheets P2*a* through P2*n*. For the application of these methods to security printing in many departments of a large company, as in the case of the present exemplary embodiment, pattern design involves generating many combinations of patterns.

Figure 11:
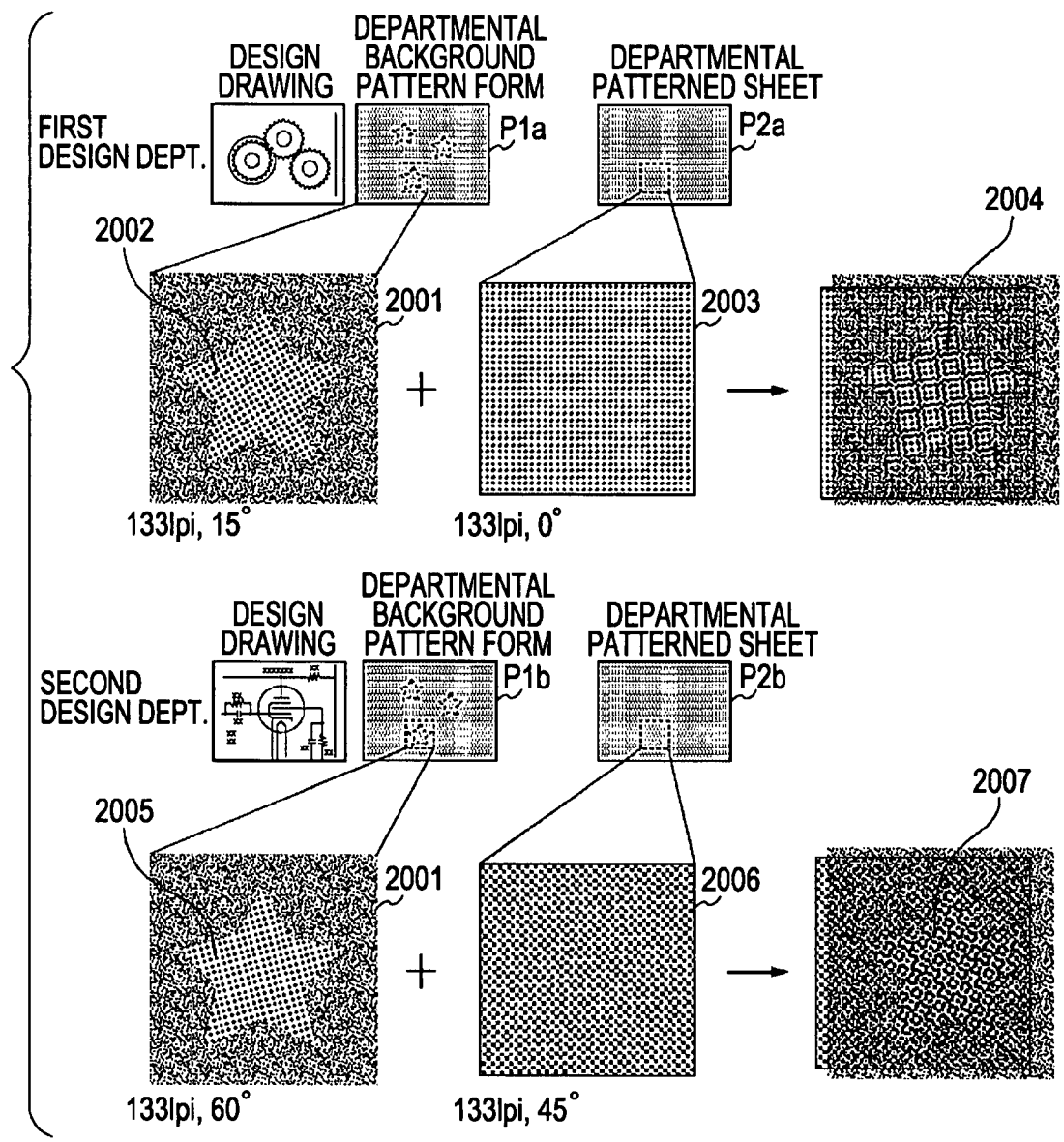
FIG. 11 illustrates a method for generating many combinations of patterns.

FIG. 11 illustrates a method for generating many combinations of patterns.

In FIG. 11, there are illustrated a background pattern 2001 of the first pattern form P1*a* for the first design department or of the second pattern form P1*b* for the second design department, a graphic pattern 2002 of the first pattern form P1*a*, a pattern 2003 of the first patterned sheet P2*a* for the first design department, an interference pattern 2004 formed by interference of the graphic pattern 2002 and the pattern 2003, a graphic pattern 2005 of the second pattern form P1*b*, a pattern 2006 of the second patterned sheet P2*b* for the second design department, and an interference pattern 2007 formed by interference of the graphic pattern 2005 and the pattern 2006.

The background pattern 2001 is common to all the departmental pattern forms and is generated by an error diffusion method.

The graphic pattern 2002 of the first pattern form P1*a* has a line density of 133 lpi and a line angle of 15 degrees, while the pattern 2003 of the first patterned sheet P2*a* has a line density of 133 lpi and a line angle of 0 degrees. The graphic pattern 2002 and the pattern 2003 have the same line density of 133 lpi and differ in line angle by 15 degrees.

Likewise, the graphic pattern 2005 of the second pattern form P1*b* has a line density of 133 lpi and a line angle of 60 degrees, while the pattern 2006 of the second patterned sheet P2*b* has a line density of 133 lpi and a line angle of 45 degrees. The graphic pattern 2005 and the pattern 2006 have the same line density of 133 lpi and differ in line angle by 15 degrees.

Since the interference patterns 2004 and 2007 resulting from the proper combinations of patterns for the first and second design departments differ from each other, each interference pattern, which is unique to each department, can be used for identification.

When pattern pairs for other departments are also formed to have the same line density and differ in line angle by 15 degrees, many interference patterns that are unique to the individual departments can be easily generated. This method is applicable to security printing in many departments.

Modification of Second Exemplary Embodiment

Figure 12:
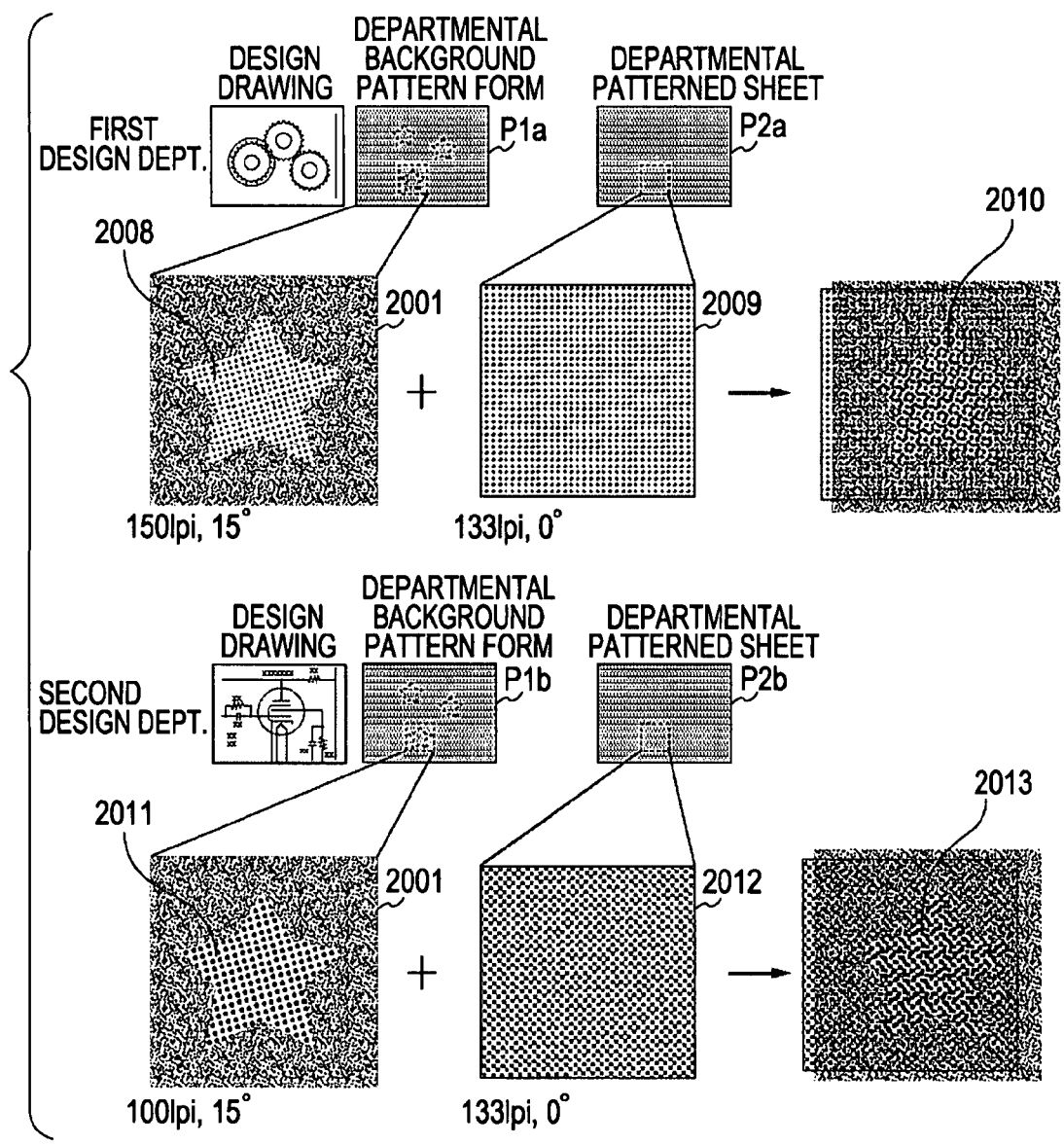
FIG. 12 illustrates a method for generating many combinations of patterns.

FIG. 12 also illustrates a method for generating many combinations of patterns.

In FIG. 12, there are illustrated a graphic pattern 2008 of the first pattern form P1*a* for the first design department, a pattern 2009 of the first patterned sheet P2*a* for the first design department, an interference pattern 2010 formed by interference of the graphic pattern 2008 and the pattern 2009, a graphic pattern 2011 of the second pattern form P1*b* for the second design department, a pattern 2012 of the second patterned sheet P2*b* for the second design department, and an interference pattern 2013 formed by interference of the graphic pattern 2011 and the pattern 2012.

As in the case of the second exemplary embodiment described above, the background pattern 2001 is common to all the departmental pattern forms and is generated by an error diffusion method.

The graphic pattern 2008 of the first pattern form P1a has a line density of 150 lpi and a line angle of 15 degrees, while the pattern 2009 of the first patterned sheet P2a has a line density of 133 lpi and a line angle of 0 degrees.

Likewise, the graphic pattern 2011 of the second pattern form P1b has a line density of 100 lpi and a line angle of 15 degrees, while the pattern 2012 of the second patterned sheet P2b has a line density of 133 lpi and a line angle of 0 degrees.

Since the interference patterns 2010 and 2013 resulting from the proper combinations of patterns for the first and second design departments differ from each other, each interference pattern, which is unique to each department, can be used for identification.

In this modification of the second exemplary embodiment, the graphic patterns 2008 and 2011 have exactly the same line angle of 15 degrees but differ in line density.

When pattern pairs for other departments are also formed to have the same line angle of 15 degrees and differ in line density, many interference patterns that are unique to the individual departments can be easily generated. This method is applicable to security printing in many departments.

Third Exemplary Embodiment

Figure 13:
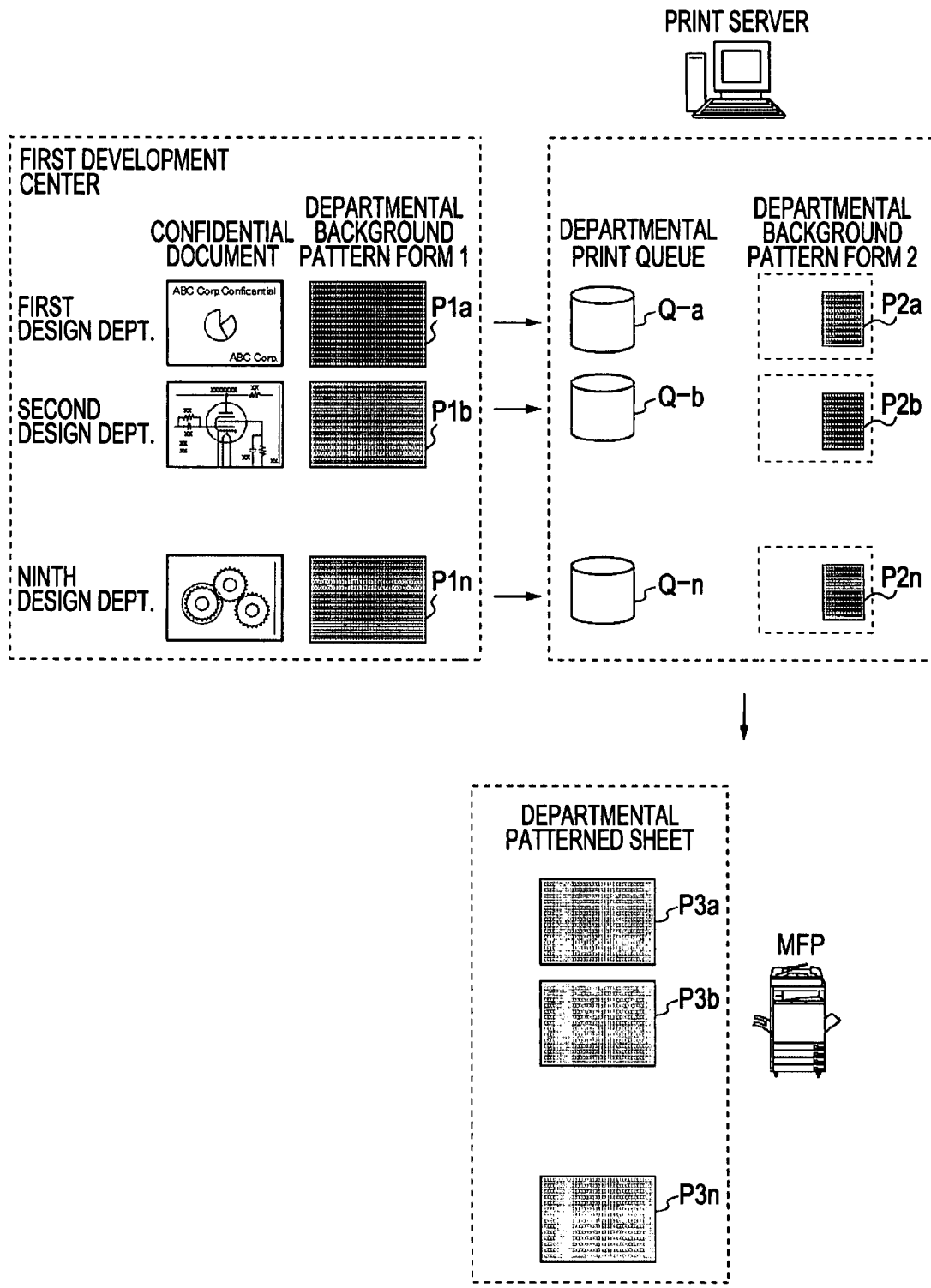
FIG. 13 illustrates a security printing system for printing confidential documents.

FIG. 13 illustrates a security printing system for printing important confidential documents.

In the methods of the first exemplary embodiment described above, a technique for transmitting two images (patterns) through different channels is used to ensure validity of a printed document. However, these methods may not be robust enough for application to valuable stock certificates and important confidential documents which are normally strictly required to be valid.

Therefore, the present exemplary embodiment proposes a method in which a larger number of images (patterns) are transmitted through three different channels to enhance robustness in ensuring validity.

FIG. 13 illustrates a process in which a confidential document from each department of a product development center of a company is printed. In FIG. 13, there are illustrated a pattern form P1a which is overlaid on a confidential document to be printed by the first design department, a print server's print queue Q-a prepared for print jobs from the first design department, a pattern form P2a added to a print job in the print queue Q-a, and a patterned sheet P3a prepared for the first design department. Also illustrated are pattern forms P1b through P1n, print queues Q-b through Q-n, and patterned sheets P3b through P3n prepared for the second through ninth design departments.

As illustrated in FIG. 13, in the present exemplary embodiment, different patterns prepared at three different points are eventually overlaid on a printed document from each design department.

A more specific description will be made with reference to FIG. 14, which illustrates actually prepared patterns and a result obtained by overlaying the patterns.

Figure 14:
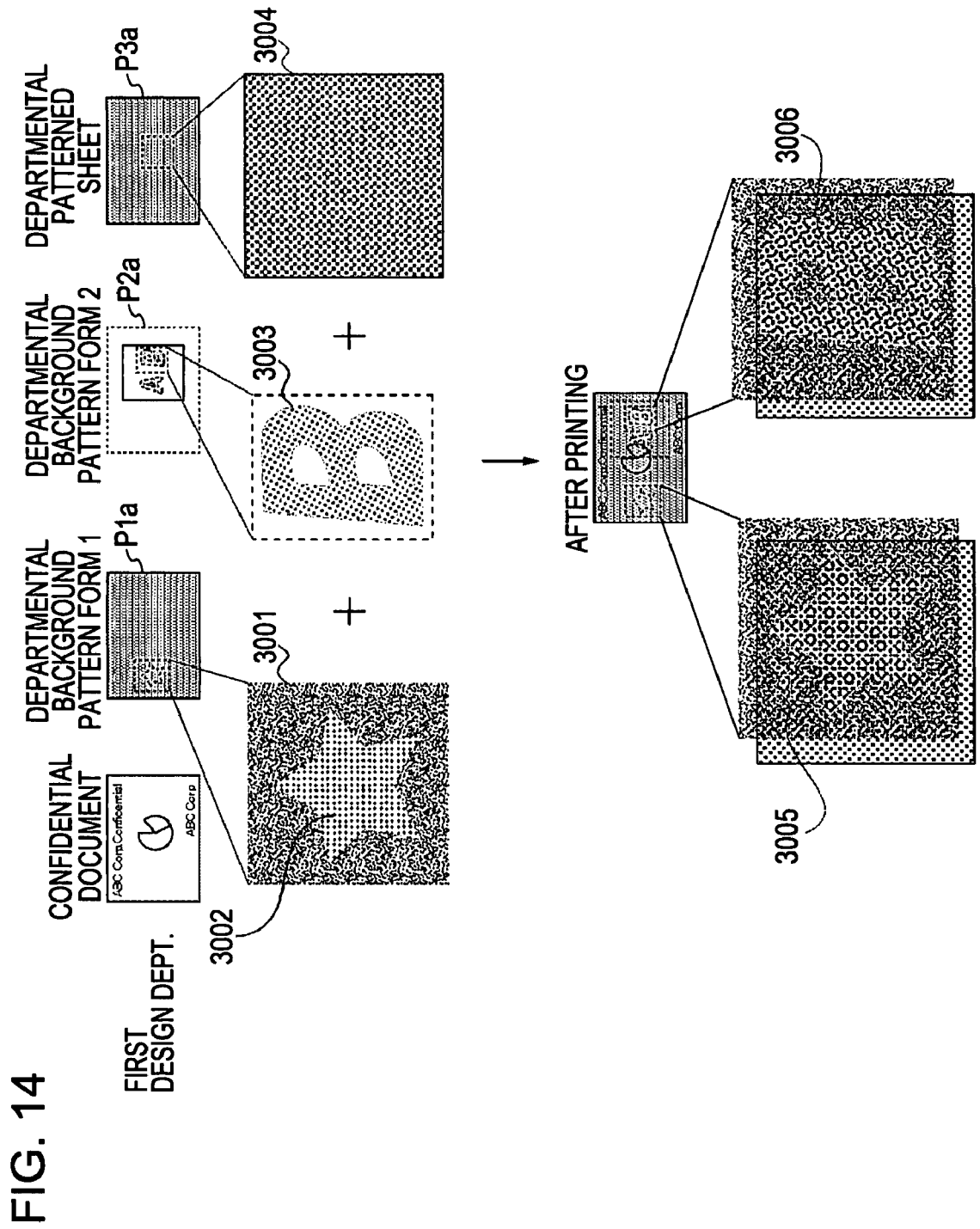
FIG. 14 illustrates patterns and a result obtained by overlaying the patterns.

In FIG. 14, there are illustrated a background pattern 3001 of the pattern form P1a, a graphic pattern 3002 of the pattern form P1a, a graphic pattern 3003 of the pattern form P2a, a background pattern 3004 of the patterned sheet P3a, an interference pattern 3005 formed at the position of the graphic pattern 3002, and an interference pattern 3006 formed at the position of the graphic pattern 3003.

The background pattern 3001 is generated by an error diffusion method, while the graphic pattern 3002 in the shape of a star has a line density of 133 lpi and a line angle of 0 degrees. A confidential document on which the pattern form P1a is overlaid by a printer driver is transmitted to the print queue Q-a. When the corresponding print job spooled in the print queue Q-a is to be transmitted to a multifunction printer, the pattern form P2a is further overlaid on the print job. The graphic pattern 3003 of the pattern form P2a has a line density of 133 lpi and a line angle of 15 degrees and is formed in the shape of a letter (such as "B"). The print job transmitted to the multifunction printer is printed on the patterned sheet P3a fed to the multifunction printer. The background pattern 3004 of the patterned sheet P3a has a line density of 133 lpi and a line angle of 45 degrees. After printing, the star-like shape of the interference pattern 3005 and the letter-like shape of the interference pattern 3006 stand out. The interference pattern 3005 and the interference pattern 3006 are different not only in shape but also in pattern itself.

According to the present exemplary embodiment described above, it is possible to more reliably ensure the validity of a printed document by combining a first pattern added to a print job for a confidential document when the print job is created, a second pattern added to the print job spooled in a print queue, and a third pattern added to a sheet used for printing, the three patterns being provided at three separate points.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-133849 filed May 12, 2006 and No. 2006-337158 filed Dec. 14, 2006, which are hereby incorporated by reference herein in their entirety.

What is claimed is:

1. An apparatus comprising:
an acquiring unit configured to acquire a first image in which a specified interference pattern is formed when synthesized with a second image, through a pathway different from that of the second image; and
a creating unit configured to create a printed material having the specified interference pattern by synthesizing the first image acquired by the acquiring unit and the second image,
wherein the second image is acquired by reading a sheet on which the second image is printed, and
wherein the acquiring unit acquires the first image by receiving the first image from a server.

2. A printed material creating method comprising:
acquiring a first image in which a specified interference pattern is formed when synthesized with a second image, through a pathway different from that of the second image; and
creating a printed material having the specified interference pattern by synthesizing the first image acquired by the acquisition and the second image,
wherein the second image is acquired by reading a sheet on which the second image is printed, and
wherein, in the acquisition, the first image is acquired by receiving the first image from a server.

3. A non-transitory computer-readable storage medium which stores a program for allowing a computer to perform a printed material creating method according to claim 2.

* * * * *